(12) United States Patent
Flood et al.

(10) Patent No.: US 7,662,323 B1
(45) Date of Patent: Feb. 16, 2010

(54) ELASTOMERIC BICOMPONENT FIBERS COMPRISING BLOCK COPOLYMERS HAVING HIGH FLOW

(75) Inventors: John E. Flood, Cypress, TX (US); Dale L. Handlin, Jr., Houston, TX (US)

(73) Assignee: Kraton Polymers U.S. LLC, Houston, TX (US)

( * ) Notice: Subject to any disclaimer, the term of this patent is extended or adjusted under 35 U.S.C. 154(b) by 0 days.

(21) Appl. No.: 12/190,900

(22) Filed: Aug. 13, 2008

Related U.S. Application Data

(62) Division of application No. 11/069,268, filed on Mar. 1, 2005.

(60) Provisional application No. 60/549,570, filed on Mar. 3, 2004.

(51) Int. Cl.
*D01D 5/34* (2006.01)

(52) U.S. Cl. .................... 264/172.15; 264/172.18; 525/88; 525/89

(58) Field of Classification Search ............ 264/172.15, 264/172.18, 172.11; 525/88, 89
See application file for complete search history.

(56) References Cited

U.S. PATENT DOCUMENTS

| | | |
|---|---|---|
| 3,645,819 A | 2/1972 | Fujii et al. |
| 3,900,678 A | 8/1975 | Aishima et al. |
| 5,060,818 A | 10/1991 | Doi et al. |
| 5,352,518 A | 10/1994 | Muramoto et al. |
| 5,405,682 A | 4/1995 | Shawyer et al. |
| 5,427,595 A | 6/1995 | Pihl et al. |
| 5,498,468 A | 3/1996 | Blaney |
| 5,733,825 A | 3/1998 | Martin et al. |
| 5,762,734 A | 6/1998 | DeLucia et al. |
| 5,811,186 A | 9/1998 | Martin et al. |
| 5,875,797 A | 3/1999 | Chiang et al. |
| 5,997,989 A | 12/1999 | Gessner et al. |
| 6,156,842 A | 12/2000 | Hoenig et al. |
| 6,159,598 A | 12/2000 | Ishimura |
| 6,190,768 B1 | 2/2001 | Turley et al. |
| 6,506,873 B1 * | 1/2003 | Ryan et al. ............ 528/354 |

(Continued)

FOREIGN PATENT DOCUMENTS

EP    0 713 546 B1    3/1997

(Continued)

*Primary Examiner*—Khanh Nguyen
*Assistant Examiner*—Scott W Dodds
(74) *Attorney, Agent, or Firm*—Gregory N. Clements; Michael A. Masse

(57) ABSTRACT

Bicomponent fibers having a sheath-core morphology where the sheath is a thermoplastic polymer and the core is an elastomeric compound are made which can be continuously extruded from the melt at high production rates. The elastomeric compound comprises a coupled, selectively hydrogenated block copolymer having high flow. The block copolymer has at least one polystyrene block of molecular weight from 5,000 to 7,000 and at least one polydiene block of molecular weight from 20,000 to 70,000 and having a high vinyl content of 60 mol % or greater. The bicomponent fibers are useful for the manufacture of articles such as woven fabrics, spunbond non-woven fabrics or filters, staple fibers, yarns and bonded, carded webs. The bicomponent fibers can be made using a process comprising coextrusion of the thermoplastic polymer and elastomeric compound to produce fibers at greater than 800 mpm and having a denier from 0.1 to 50 g/9000 m.

4 Claims, 1 Drawing Sheet

U.S. PATENT DOCUMENTS

| | | |
|---|---|---|
| 6,541,403 B2 | 4/2003 | Billarant et al. |
| 6,548,166 B2 | 4/2003 | Figuly et al. |
| 6,677,038 B1 | 1/2004 | Topolkaraev et al. |
| 6,742,528 B2 | 6/2004 | Dave |
| 6,773,810 B2 | 8/2004 | Sen et al. |
| 6,777,082 B2 | 8/2004 | Patel et al. |
| 6,783,853 B2 | 8/2004 | Figuly et al. |
| 6,811,871 B2 | 11/2004 | Sen et al. |
| 6,881,375 B2 | 4/2005 | Topolkaraev et al. |
| 6,890,466 B2 | 5/2005 | Kobayashi et al. |
| 2002/0088501 A1 | 7/2002 | Bruner |
| 2002/0147273 A1* | 10/2002 | Patel et al. .................. 525/93 |
| 2003/0005997 A1 | 1/2003 | Bruner |
| 2003/0055162 A1 | 3/2003 | Sen et al. |
| 2003/0134958 A1 | 7/2003 | Chen |
| 2003/0162458 A1 | 8/2003 | Tsujiyama et al. |
| 2003/0171052 A1 | 9/2003 | Bansal et al. |
| 2003/0204019 A1 | 10/2003 | Ding et al. |
| 2004/0214498 A1* | 10/2004 | Webb et al. ................ 442/329 |
| 2005/0031865 A1 | 2/2005 | Sauer et al. |

FOREIGN PATENT DOCUMENTS

| | | |
|---|---|---|
| EP | 0 625 221 B1 | 5/1997 |
| EP | 0 881 259 A2 | 12/1998 |
| EP | 1 002 813 A1 | 5/2000 |
| EP | 1 275 891 A1 | 1/2003 |
| JP | 61-194221 | 8/1986 |
| JP | 62-184118 | 8/1987 |
| JP | 04-361613 | 12/1992 |
| JP | 05-051823 | 3/1993 |
| JP | 06 002220 | 1/1994 |
| JP | 06-025920 | 2/1994 |
| JP | 09-003725 | 1/1997 |
| JP | 09 095821 | 4/1997 |
| JP | 09-291454 | 11/1997 |
| JP | 10-072728 | 3/1998 |
| JP | 2000-008225 | 1/2000 |
| JP | 2000-282329 | 10/2000 |
| WO | 94/25648 | 11/1994 |
| WO | 97/49848 A1 | 12/1997 |
| WO | 98/06350 A1 | 2/1998 |
| WO | 00/08243 | 2/2000 |
| WO | 02/27083 A1 | 4/2002 |
| WO | WO 03/064528 * | 8/2003 |
| WO | 2004/108784 A1 | 12/2004 |

* cited by examiner

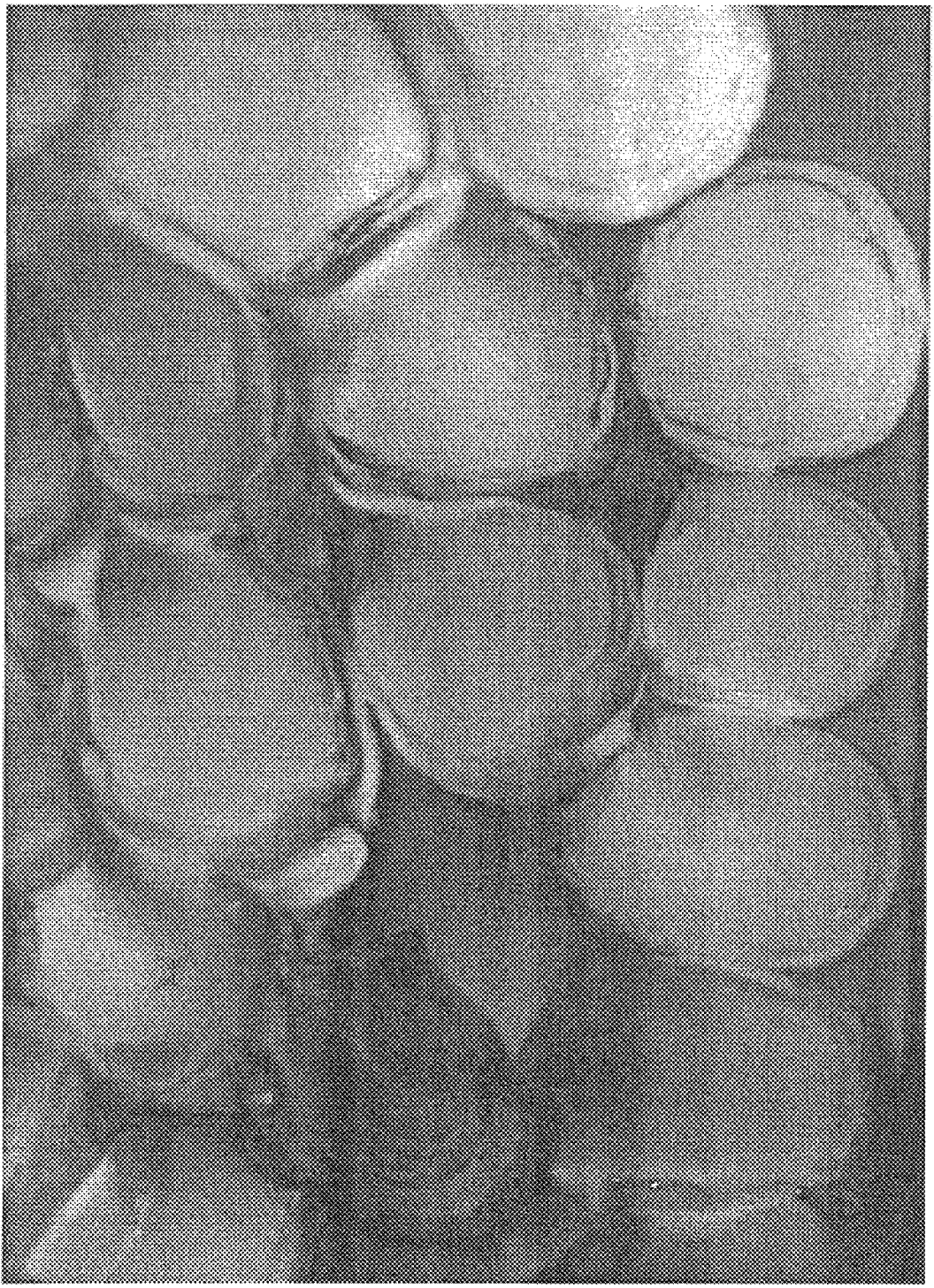

ELASTOMERIC BICOMPONENT FIBERS COMPRISING BLOCK COPOLYMERS HAVING HIGH FLOW

CROSS-REFERENCE TO RELATED APPLICATIONS

The present application is a divisional of U.S. patent application Ser. No. 11/069,268 filed Mar. 1, 2005, which claims the benefit of U.S. provisional patent application Ser. No. 60/549,570, filed Mar. 3, 2004, entitled Block Copolymers having High Flow and High Elasticity.

FIELD OF THE INVENTION

The invention relates to bicomponent fibers comprising a thermoplastic polymer sheath and an elastomeric core. In particular the elastomeric core comprises a block copolymer of mono alkenyl arene and conjugated diene blocks having high flow. The invention also relates to processes for producing bicomponent fibers. The invention further relates to articles made from bicomponent fibers.

BACKGROUND

Fibers made from elastic materials find use in a variety of applications ranging from woven fabrics to spunbond elastic mats to disposable, personal hygiene items. It would be of particular interest to use styrenic block copolymers for such applications. However, the typical phase-separated nature of block copolymer melts leads to high melt elasticity and high melt viscosity. In order to process styrenic block copolymers through small orifices, such as found in fiber spinnerets, expensive and specialized melt pump equipment would be required. Further, the high melt elasticities lead to fracture of the fiber as it exits the die, preventing the formation of continuous elastomeric fibers. As a result, styrenic block copolymers have been found to be exceedingly difficult to process into continuous elastic fibers at high processing rates.

A further problem with styrenic block copolymers is their inherent stickiness in the melt. Because of this character, melt spun fibers of styrenic block copolymers tend to stick together, or self-adhere, during processing. This effect is not desired and can be, in fact, tremendously problematic when separate, continuous fibers are the goal. In addition to the result of an unacceptable fiber product, the self-adhesion of the fibers leads to equipment fouling and expensive shutdowns. Efforts to apply styrenic block copolymers in elastic fiber production have to date been met with significant challenges.

Himes taught the use of triblock/diblock copolymer blends as one approach to make elastomeric fibers in U.S. Pat. No. 4,892,903. These types of compositions have been found to have high viscosities and melt elasticities which have limited them to formation of discontinous and continuous fibers such as used in melt-blown, non-woven applications.

Bicomponent fibers comprising acid functionalized styrenic block copolymers have been taught by Greak in European Patent Application 0 461 726. Conventional, selectively hydrogenated styrenic block copolymers which were acid functional were used to form side-by-side bicomponent fibers with polyamides. While the acid functionalization provided increased adhesion between the two components, it is well known in the art that acid functionalization leads to even higher melt viscosities and melt elasticities than in unfunctionalized block copolymers. Further, the side-by-side morphologies taught by Greak would not prevent the inherently sticky fibers from self-adhering during processing.

Bonded non-woven webs made using bicomponent fibers comprising, among other polymers, conventional styrenic block copolymers and having a variety of morphologies has been taught by Austin in U.S. Pat. No. 6,225,243. In particular, the sheath-core morphologies, with the core being comprised of styrenic block copolymers, provided fibers of suitably low stickiness to form non-woven webs.

However, high viscosity and melt elasticity of conventional styrenic block copolymers continues to prevent high speed spinning of continuous elastomeric fibers. The present invention addresses these longstanding needs by providing a high melt flow block copolymer which is able to be formed into continuous elastomeric bicomponent fibers.

SUMMARY OF THE INVENTION

In one aspect, the present invention is a bicomponent fiber comprising a thermoplastic polymer sheath and an elastomeric core wherein the elastomeric core comprises a selectively hydrogenated block copolymer having an S block and an E or $E_1$ block and having the general formula:

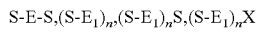

$$S\text{-}E\text{-}S, (S\text{-}E_1)_n, (S\text{-}E_1)_n S, (S\text{-}E_1)_n X$$

or mixtures thereof; wherein:

a. prior to hydrogenation the S block is a polystyrene block;
b. prior to hydrogenation the E block is a polydiene block, selected from the group consisting of polybutadiene, polyisoprene and mixtures thereof, having a molecular weight from 40,000 to 70,000;
c. prior to hydrogenation the $E_1$ block is a polydiene block, selected from the group consisting of polybutadiene, polyisoprene, and mixtures thereof; having a molecular weight from 20,000 to 35,000;
d. n has a value of 2 to 6 and X is the residue of a coupling agent;
e. the styrene content of the block copolymer is from 13 to 25 weight percent;
f. the vinyl content of the polydiene block prior to hydrogenation is from 70 to 85 mol percent;
g. the block copolymer includes less than 15 weight percent of units having the general formula:

$$S\text{-}E \text{ or } S\text{-}E_1$$

wherein S, E and $E_1$ are as already defined;
h. subsequent to hydrogenation about 0 to 10% of the styrene double bonds have been hydrogenated and at least 80% of the conjugated diene double bonds have been hydrogenated;
i. the molecular weight of each of the S blocks is from 5,000 to 7,000; and
j. the melt index of the block copolymer is greater than or equal to 12 grams/10 minutes according to ASTM D1238 at 230° C. and 2.16 kg weight.

In another aspect the invention is an article such as an elastomeric mono filament, a woven fabric, a spun bond non-woven fabric, a melt blown non-woven fabric or filter, a staple fiber, a yarn or a bonded, carded web comprising the bicomponent fiber described herein.

In a further aspect the invention is a process to produce a bicomponent fiber comprising coextrusion of a thermoplastic polymer and an elastomeric compound comprising a selectively hydrogenated block copolymer as described herein wherein the thermoplastic polymer and the elastomeric compound are forced using separate melt pumps through a die to form one or more fibers having a sheath primarily composed of thermoplastic polymer and a core comprised of the elastomeric compound at a rate of at least 500 meters per minute such that the resulting bicomponent fiber has a denier per filament of 0.1 to 10 grams per 9000 meters.

Importantly, the invention comprises an elastomeric compound in the core having high melt flow which allows processing of bicomponent fibers on commercial-type equipment at high rates. The high melt flow of the elastomeric core compound can be achieved with selectively hydrogenated block copolymers having high vinyl contents, sufficiently low molecular weights, or by some combination of these features.

The elastomeric core compound may further comprise a thermoplastic polymer which is compositionally the same or different from the sheath material. Incorporation of a thermoplastic polymer in the elastomeric core may increase the core-sheath compatibility, increase the core-sheath adhesion, increase the processability of the elastomeric compound, and/or improve the material economics.

FIGURE

FIG. 1 shows a cross-section of a bundle of bicomponent fibers of the present invention. The thermoplastic polymer sheath is apparent as an annular region surrounding each elastomeric core.

DETAILED DESCRIPTION OF THE PREFERRED EMBODIMENTS

The bicomponent fibers of the present invention comprise a thermoplastic polymer sheath and an elastomeric compound core comprising a selectively hydrogenated block copolymer. The bicomponent fiber is made by a coextrusion process in which the thermoplastic polymer and the elastomeric compound core are metered to a die or spinneret separately. Such a coextruded bicomponent fiber can have a variety of morphologies including, but not limited to, sheath-core, side-by-side, islands in the sea, bilobal, trilobal, and pie-section.

In the present invention it is important that the sheath form the majority of the outside surface of the fiber. In particular, the sheath-core morphology wherein the sheath forms a covering about the core is preferred. In this preferred morphology, the core may be centered in the fiber cross-section or may be off-center. The sheath may cover the core in a complete fashion over the circumference of the fiber or may be only partially covering over the circumference of the fiber. In the case where the covering is partial about the circumference, the morphology is distinguished from side-by-side morphologies in that the core makes up the majority of the volume of the fiber. The volume ratio of the sheath to the core in the present invention is from 5/95 to 49/51. The preferred range of sheath to core volume ratio is 10/90 to 40/60 and the most preferred range is 20/80 to 30/70. The sheath consists primarily of a thermoplastic polymer and the core consists primarily of an elastomeric compound. As used herein "consists primarily" means greater than 80% on a volume basis.

The elastomeric compound core comprises a selectively hydrogenated block copolymer having an S block and an E or $E_1$ block and having the general formula:

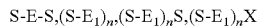

or mixtures thereof, wherein: (a) prior to hydrogenation, the S block is a polystyrene block; (b) prior to hydrogenation, the E block or $E_1$ block is a polydiene block, selected from the group consisting of polybutadiene, polyisoprene and mixtures thereof. The block copolymer can be linear or radial having three to six arms. General formulae for the linear configurations include:

wherein the E black is a polydiene block, selected from the group consisting of polybutadiene, polyisoprene and mixtures thereof, having a molecular weight of from 40,000 to 70,000; the $E_1$ block is a polydiene block, selected from the group consisting of polybutadiene, polyisoprene and mixtures thereof, having a molecular weight of from 20,000 to 35,000; and n has a value from 2 to 6, preferably from 2 to 4, an more preferably an average of approximately 3. By example, the general formula for the radial configurations having three and four arms include:

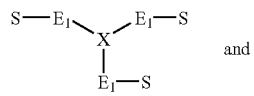

and

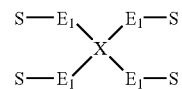

wherein the $E_1$ block is a polydiene block, selected from the group consisting of polybutadiene, polyisoprene and mixtures thereof, having a molecular weight of from 20,000 to 35,000; and X is a coupling agent residue.

As used herein, the term "molecular weights" refers to the true molecular weight in g/mol of the polymer or block of the copolymer. The molecular weights referred to in this specification and claims can be measured with gel permeation chromatography (GPC) using polystyrene calibration standards, such as is done according to ASTM 3536. GPC is a well-known method wherein polymers are separated according to molecular size, the largest molecule eluting first. The chromatograph is calibrated using commercially available polystyrene molecular weight standards. The molecular weight of polymers measured using GPC so calibrated are styrene equivalent molecular weights. The styrene equivalent molecular weights may be converted to true molecular weights when the styrene content of the polymer and the vinyl content of the diene segments are known. The detector used is preferably a combination ultraviolet and refractive index detector. The molecular weights expressed herein are measured at the peak of the GPC trace, converted to true molecular weights, and are commonly referred to as "peak molecular weights".

The block copolymers of the present invention are prepared by anionic polymerization of styrene and a diene selected from the group consisting of butadiene, isoprene and mixtures thereof. The polymerization is accomplished by contacting the styrene and diene monomers with an organoalkali metal compound in a suitable solvent at a temperature within the range from about −150° C. to about 300° C., preferably at a temperature within the range from about 0° C. to about 100° C. Particularly effective anionic polymerization initiators are organolithium compounds having the general formula $RLi_n$ where R is an aliphatic, cycloaliphatic, aromatic, or alkyl-substituted aromatic hydrocarbon radical having from 1 to 20 carbon atoms; and n has a value of 1 to 4. Preferred initiators include n-butyl lithium and sec-butyl lithium. Methods for anionic polymerization are well known and can be found in such references as U.S. Pat. No. 4,039,593 and U.S. Reissue Pat. No. Re 27,145.

The block copolymers of the present invention can be linear, linear coupled, or a radial block copolymer having a mixture of 2 to 6 "arms". Linear block copolymers can be made by polymerizing styrene to form a first S block, adding butadiene to form an E block, and then adding additional styrene to form a second S block. A linear coupled block copolymer is made by forming the first S block and E block and then contacting the diblock with a difunctional coupling agent. A radial block copolymer is prepared by using a coupling agent that is at least trifunctional.

Difunctional coupling agents useful for preparing linear block copolymers include, for example, methyl benzoate as disclosed in U.S. Pat. No. 3,766,301. Other coupling agents having two, three or four functional groups useful for forming radial block copolymers include, for example, silicon tetrachloride and alkoxy silanes as disclosed in U.S. Pat. Nos. 3,244,664, 3,692,874, 4,076,915, 5,075,377, 5,272,214 and 5,681,895; polyepoxides, polyisocyanates, polyimines, polyaldehydes, polyketones, polyanhydrides, polyesters, polyhalides as disclosed in U.S. Pat. No. 3,281,383; diesters as disclosed in U.S. Pat. No. 3,594,452; methoxy silanes as disclosed in U.S. Pat. No. 3,880,954; divinyl benzene as disclosed in U.S. Pat. Nos. 3,985,830; 1,3,5-benzenetricarboxylic acid trichloride as disclosed in U.S. Pat. No. 4,104,332; glycidoxytrimethoxy silanes as disclosed in U.S. Pat. No. 4,185,042; and oxydipropylbis(trimethoxy silane) as disclosed in U.S. Pat. No. 4,379,891.

In one embodiment of the present invention, the coupling agent used is an alkoxy silane of the general formula $R_x$—Si—$(OR')_y$, where x is 0 or 1, x+y=3 or 4, R and R' are the same or different, R is selected from aryl, linear alkyl and branched alkyl hydrocarbon radicals, and R' is selected from linear and branched alkyl hydrocarbon radicals. The aryl radicals preferably have from 6 to 12 carbon atoms. The alkyl radicals preferably have 1 to 12 carbon atoms, more preferably from 1 to 4 carbon atoms. Under melt conditions these alkoxy silane coupling agents can couple further to yield functionalities greater than 4. Preferred tetra alkoxy silanes are tetramethoxy silane ("TMSi"), tetraethoxy silane ("TESi"), tetrabutoxy silane ("TBSi"), and tetrakis(2-ethylhexyloxy)silane ("TEHSi"). Preferred trialkoxy silanes are methyl trimethoxy silane ("MTMS"), methyl triethoxy silane ("MTES"), isobutyl trimethoxy silane ("IBTMO") and phenyl trimethoxy silane ("PhTMO"). Of these the more preferred are tetraethoxy silane and methyl trimethoxy silane.

One important aspect of the present invention is the microstructure of the polymer. The microstructure relevant to the present invention is a high amount of vinyl in the E and/or $E_1$ blocks. This configuration can be achieved by the use of a control agent during polymerization of the diene. A typical agent is diethyl ether. See U.S. Pat. No. Re 27,145 and U.S. Pat. No. 5,777,031, the disclosure of which is hereby incorporated by reference. Any microstructure control agent known to those of ordinary skill in the art of preparing block copolymers to be useful can be used to prepare the block copolymers of the present invention.

In the practice of the present invention, the block copolymers are prepared so that they have from about 60 to about 85 mol percent vinyl in the E and/or $E_1$ blocks prior to hydrogenation. In another embodiment, the block copolymers are prepared so that they have from about 65 to about 85 mol percent vinyl content. In still another embodiment, the block copolymers are prepared so that they have from about 70 to about 85 mol percent vinyl content. Another embodiment of the present invention includes block copolymers prepared so that they have from about 73 to about 83 mol percent vinyl content in the E and/or $E_1$ blocks.

In one embodiment, the present invention is a hydrogenated block copolymer. The hydrogenated block copolymers of the present invention are selectively hydrogenated using any of the several hydrogenation processes know in the art. For example the hydrogenation may be accomplished using methods such as those taught, for example, in U.S. Pat. Nos. 3,494,942; 3,634,594; 3,670,054; 3,700,633; and Re. 27,145, the disclosures of which are hereby incorporated by reference. Any hydrogenation method that is selective for the double bonds in the conjugated polydiene blocks, leaving the aromatic unsaturation in the polystyrene blocks substantially intact, can be used to prepare the hydrogenated block copolymers of the present invention.

The methods known in the prior art and useful for preparing the hydrogenated block copolymers of the present invention involve the use of a suitable catalyst, particularly a catalyst or catalyst precursor comprising an iron group metal atom, particularly nickel or cobalt, and a suitable reducing agent such as an aluminum alkyl. Also useful are titanium based catalyst systems. In general, the hydrogenation can be accomplished in a suitable solvent at a temperature within the range from about 20° C. to about 100° C., and at a hydrogen partial pressure within the range from about 100 psig (689 kPa) to about 5,000 psig (34,473 kPa). Catalyst concentrations within the range from about 10 ppm to about 500 ppm by wt of iron group metal based on total solution are generally used and contacting at hydrogenation conditions is generally continued for a period of time with the range from about 60 to about 240 minutes. After the hydrogenation is completed, the hydrogenation catalyst and catalyst residue will, generally, be separated from the polymer.

In the practice of the present invention, the hydrogenated block copolymers have a hydrogenation degree greater than 80 percent. This means that more than from 80 percent of the conjugated diene double bonds in the E or $E_1$ block has been hydrogenated from an alkene to an alkane. In one embodiment, the E or $E_1$ block has a hydrogenation degree greater than about 90 percent. In another embodiment, the E or $E_1$ block has a hydrogenation degree greater than about 95 percent.

In the practice of the present invention, the styrene content of the block copolymer is from about 13 percent to about 25 weight percent. In one embodiment, the styrene content of the block copolymer is from about 15 percent to about 24 percent. Any styrene content within these ranges can be used with the present invention. Subsequent to hydrogenation, from 0 to 10 percent of the styrene double bonds in the S blocks have been hydrogenated in the practice of the present invention.

The molecular weight of each of the S blocks in the block copolymers of the present invention is from about 5,000 to about 7,000 in the block copolymers of the present invention. In one embodiment, the molecular weight of each of the S blocks is from about 5,800 to about 6,600. The S blocks of the block copolymers of the present invention can be a polystyrene block having any molecular weight within these ranges.

In the practice of the present invention, the E blocks are a single polydiene block. These polydiene blocks can have molecular weights that range from about 40,000 to about 70,000. The $E_1$ block is a polydiene block having a molecular weight range of from about 20,000 to about 35,000. In one embodiment, the molecular weight range of the E block is from about 45,000 to about 60,000, and the molecular weight range for each $E_1$ block of a coupled block copolymer, prior to being coupled, is from about 22,500 to about 30,000.

One advantage of the present invention over conventional hydrogenated block copolymer is that they have high melt flows that allow them to be easily molded or continuously extruded into shapes or films or spun into fibers. This property allows end users to avoid or at least limit the use of additives that degrade properties, cause area contamination, smoking, and even build up on molds and dies. But the hydrogenated block copolymers of the present invention also are very low in contaminants that can cause these undesirable effects, such as diblocks from inefficient coupling. The block copolymers and hydrogenated block copolymers of the present invention have less than 15 weight percent of diblock content, such diblocks having the general formula:

SE or $SE_1$ wherein S, E and $E_1$ are as previously defined. In one embodiment, the diblock level is less than 10 percent in another embodiment less than 8 percent. For example, where the structure of the hydrogenated block copolymer is $(S-E_1)_2X$, the block copolymer contains less than 10% of the $S-E_1$ species. All percentages are by weight.

One characteristic of the hydrogenated block copolymers of the present invention is that they have a low order-disorder temperature. The order-disorder temperature (ODT) of the hydrogenated block copolymers of the present invention is typically less than about 250° C. Above 250° C. the polymer is more difficult to process although in certain instances for some applications ODT's greater than 250° C. can be utilized. One such instance is when the block copolymer is combined with other components to improve processing. Such other components may be thermoplastic polymers, oils, resins, waxes or the like. In one embodiment, the ODT is less than about 240° C. Preferably, the hydrogenated block copolymers of the present invention have an ODT of from about 210° C. to about 240° C. This property can be important in some applications because when the ODT is below 210° C., the block copolymer may exhibit creep that is undesirably excessive or low strength. For purposes of the present invention, the order-disorder temperature is defined as the temperature above which a zero shear viscosity can be measured by capillary rheology or dynamic rheology.

For the purposes of the present invention, the term "melt index" is a measure of the melt flow of the polymer according ASTM D1238 at 230° C. and 2.16 kg weight. It is expressed in units of grams of polymer passing through a melt rheometer orifice in 10 minutes. The hydrogenated block copolymers of the present invention have a desirable high melt index allowing for easier processing than similar hydrogenated block copolymers that have higher melt indexes. In one embodiment, the hydrogenated block copolymers of the present invention have a melt index of greater than or equal to 12. In another embodiment, the hydrogenated block copolymers of the present invention have a melt index of at least 15. In still another embodiment, the hydrogenated block copolymers of the present invention have a melt index of at least 40. Another embodiment of the present invention includes hydrogenated block copolymers having a melt index of from about 20 to about 100. Still another embodiment of the present invention includes hydrogenated block copolymers having a melt index of from about 50 to about 85.

In a further embodiment, the elastomeric compound core is further comprised of a thermoplastic polymer. In this embodiment, the elastomeric core contains up to 50% by weight of a thermoplastic polymer such as polypropylene, linear low density polyethylene, polyamides, poly(ethylene terephthalate), poly(butylene terephthalate), poly(trimethylene terephthalate) and other thermoplastics as described herein in reference to the sheath composition.

In a still further embodiment, the elastomeric core of the bicomponent fiber comprises a selectively hydrogenated block copolymer having a vinyl content in the range of about 20 to about 60 mol percent. In this embodiment, the block copolymer has a total true molecular weight such that it has high melt index according to the description presented herein.

The present invention includes a sheath composed primarily of a thermoplastic polymer. Exemplary thermoplastic polymers include, for example, ethylene homopolymers, ethylene/alpha-olefin copolymers, propylene homopolymers, propylene/alpha-olefin copolymers, impact polypropylene copolymers, butylene homopolymers, butylene/alpha olefin copolymers, and other alpha olefin copolymers or interpolymers.

Representative polyethylenes include, for example, but are not limited to, substantially linear ethylene polymers, homogeneously branched linear ethylene polymers, heterogeneously branched linear ethylene polymers, including linear low density polyethylene (LLDPE), ultra or very low density polyethylene (ULDPE or VLDPE), medium density polyethylene (MDPE), high density polyethylene (HDPE) and high pressure low density polyethylene (LDPE).

When the thermoplastic polymer is polyethylene, the melt flow rate, also referred to as melt flow index, must be at least 25 g/10 min at 230° C. and 2.16 kg weight according to ASTM D1238. The preferred type of polyethylene is linear low density polyethylene.

Representative polypropylenes include, for example, but are not limited to, substantially isotactic propylene homopolymers, random alpha olefin/propylene copolymers where propylene is the major component on a molar basis and polypropylene impact copolymers where the polymer matrix is primarily a polypropylene homopolymer or random copolymer and the rubber phase is an alpha-olefin/propylene random copolymer. Suitable melt flow rates of polypropylenes are at least 10 g/10 min at 230° C. and 2.16 kg according to ASTM D1238. More preferred are melt flow rates of at least 20 g/10 min. Polypropylene homopolymers are the preferred type of polypropylene.

Examples of ethylene/alpha-olefin copolymers and propylene/alpha-olefin copolymers include, but are not limited to, AFFINITY, ENGAGE and VERSIFY polymers from Dow Chemical and EXACT and VISTAMAXX polymers from Exxon Mobil. Suitable melt flow rates of such copolymers must be at leas 10 g/10 min at 230° C. and 2.16 kg weight according to ASTM D1238.

Still other thermoplastic polymers included herein are polyvinyl chloride (PVC) and blends of PVC with other materials, polyamides and polyesters such as poly(ethylene terephthalate), polybutylene terephthalate) and poly(trimethylene terephthalate). Regardless of the specific type, the thermoplastic polymer must have a melt flow rate suitable for processing into fibers or components of fibers.

It is sometimes desirable to use processing aids and other additives in the elastomeric core compound. Exemplary of such aids and additives are members selected from the group consisting of other block copolymers, olefin polymers, styrene polymers, tackifying resins, polymer extending oils, waxes, fillers, reinforcements, lubricants, stabilizers, and mixtures thereof.

In the embodiments of the present invention it is especially useful to include resins compatible with the rubber E and/or $E_1$ blocks of the elastomeric compound. This serves to promote the flow of the elastomeric compound. Various resins are known, and are discussed, e.g., in U.S. Pat. Nos. 4,789,699; 4,294,936; and 3,783,072, the contents of which, with respect to the resins, are incorporated herein by reference. Any resin can be used which is compatible with the rubber E and/or $E_1$ blocks of the elastomeric compound and/or the polyolefin, and can withstand the high processing (e.g., extrusion) temperatures. Generally, hydrogenated hydrocarbon resins are preferred resins, because of their better temperature stability. Examples illustrative of useful resins are hydrogenated hydrocarbon resins such as low molecular weight, fully hydrogenated α-methylstyrene REGALREZ® (Eastman Chemical), ARKON® P (Arakawa Chemical) series resins, and terpene hydrocarbons such as ZONATAC® 501 Lite (Arizona Chemical). The present invention is not limited to use of the resins listed here. In general, the resin may be selected from the group consisting of $C_5$ hydrocarbon resins, hydrogenated $C_5$ hydrocarbon resins, styrenated $C_5$ resins, $C_5/C_9$ resins, styrenated terpene resins, fully hydrogenated or partially hydrogenated $C_9$ hydrocarbon resins, rosins esters, rosins derivatives and mixtures thereof. One of ordinary skill in the art will understand that other resins which are compatible with the components of the composition and can withstand the high processing temperatures, and can achieve the objectives of the present invention, can also be used.

The bicomponent fiber may also comprise a wax to promote flow and/or compatibility. Suitable waxes are those having a congealing point of from 50 to 70° C. Suitable amounts of wax are from 0.1 to 75% w, preferably from 5 to 60% wt based on the weight of the elastomeric compound. Animal, insect, vegetable, synthetic and mineral waxes may be used with those derived from mineral oils being preferred. Examples of mineral oil waxes include bright stock slack wax, medium machine oil slack wax, high melting point waxes and microcrystalline waxes. In the case of slack waxes up to 25% w of oil may be present. Additives to increase the congealing point of the wax may also be present.

The bicomponent fiber may also comprise an oil. The oil may be incorporated to improve the processability of the fiber or to enhance its softness. Especially preferred are the types of oil that are compatible with the E and/or $E_1$ of the block copolymer. While oils of higher aromatics content are satisfactory, those petroleum-based white oils having low volatility and less than 50% aromatic content are preferred. The oils should additionally have low volatility, preferable having an initial boiling point above about 260° C. The amount of oil employed varies from about 0 to about 300 parts by weight per hundred parts by weight rubber, or block copolymer, preferably about 20 to about 150 parts by weight.

The elastomeric compound is typically stabilized by the addition of an antioxidant or mixture of antioxidants. Frequently, a sterically hindered phenolic stabilizer is used, or a phosphorus-based stabilizer is used in combination with a sterically hindered phenolic stabilizer, such as disclosed in Japanese patent No. 94055772; or a combination of phenolic stabilizers is used, such as disclosed in Japanese patent No. 94078376.

Other additives such as pigments, dyes, optical brighteners, bluing agents and flame retardants may be used in the bicomponent fibers of the present invention.

The bicomponent fibers of the present invention can be used to form a variety of articles. These articles include elastic mono filaments, woven fabrics, spunbond non-woven fabrics or filters, melt-blown fabrics, staple fibers, yarns, bonded, carded webs, and the like. Any of the processes typically used to make these articles can be employed when they are equipped to extrude two materials into a bicomponent fiber.

In particular, non-woven fabrics or webs can be formed by any of the processes known in the art. One process, typically referred to as spunbond, is well known in the art. U.S. Pat. No. 4,405,297 describes a typical spunbond processes. The spunbond process commonly comprises extruding the fibers from the melt through a spinneret, quenching and/or drawing the fibers using an air flow, and collecting and bonding the non-woven web. The bonding of the non-woven web is typically accomplished by any thermal, chemical or mechanical methods, including water entanglement and needle punch processes, effective in creating a multiplicity of intermediate bonds among the fibers of the web. The non-woven webs of the present invention can also be formed using melt-blown process such as described in U.S. Pat. No. 5,290,626. Carded webs may be formed from non-woven webs by folding and bonding the non-woven web upon itself in the cross machine direction.

The non-woven fabrics of the present invention can be used for a variety of elastic fabrics such as diapers, waist bands, stretch panels, disposable garments, medical and personal hygiene articles, filters, and the like.

Elastic mono-filaments of the present invention are continuous, single, bicomponent fibers used for a variety of purposes and can be formed by any of the known methods of the art comprising spinning, drawing, quenching and winding. As used herein, staple fiber means cut or chopped segments of the continuously coextruded bicomponent fiber.

Yarns of the bicomponent fibers can be formed by common processes. U.S. Pat. No. 6,113,825 teaches the general process of yarn formation. In general, the process comprises melt extrusion of multiple fibers from a spinneret, drawing and winding the filaments together to form a multi-filament yarn, extending or stretching the yarn optionally through one or more thermal treatment zones, and cooling and winding the yarn.

The articles of the present invention can be used alone or in combination with other articles made with the bicomponent fibers or with other classes of materials. As an example, non-woven webs can be combined with elastic mono-filaments to provide elastic stretch panels. As another example, non-woven webs can be bonded to other non-elastomeric non-woven webs or polymeric films of many types.

In the process of producing the bicomponent fiber of the present invention two separate single screw extruders are used to extrude the sheath polymer and core polymer into two separate melt pumps. Following the melt pumps, the polymers are brought together into their bicomponent configuration in the spinneret via a series of plates and baffles. Upon exiting the spinneret the fibers are cooled/quenched via a cold air quench cabinet. After quenching the fibers are drawn via an aspirator or a series of cold rolls. In the case that cold rolls are used, the fibers are taken up onto a winder. In the case that an aspirator is used, the fibers are allowed to collect in a drum beneath the aspirator.

One important aspect of the process is the rate at which the bicomponent fibers may be produced. The high flow characteristics presented by the inventive fibers allows high extrusion rates. This is important from a practical sense since commercial equipment operates at high extrusion rates. In this way, economic throughputs can be achieved. In the present invention, extrusion rates of at least 800 meters per minute (mpm) are required. More preferred are rates about 1000 mpm or greater and most preferred are rates about 2000 mpm or greater.

For the applications disclosed herein, fine denier fibers are preferred. These fine denier fibers are extremely efficient elastic materials in the sense that very small amounts of material can be used to affect elastic behavior in articles so composed. In the present invention bicomponent fibers having a denier (grams per 9000 m fiber) from 0.1 to 30 can be made. More preferred are fibers having a denier from 0.5 to 20 g/9000 m and most preferred are fibers having a denier from 1 to 10 g/9000 m.

EXAMPLES

The term "elastic" is used herein to mean any material which, upon application of a biasing force, is stretchable, that is, elongatable at least about 60 percent (i.e., to a stretched, biased length which is at least about 160 percent of its relaxed unbiased length) and which, will recover at least 50 percent of its elongation upon release of the stretching, elongating force. A hypothetical example would be a one (1) inch sample of a material which is elongatable to at least 1.60 inches (4.06 cm) and which, upon being elongated to 1.60 inches (4.06 cm) and released, will recover to a length of not more than 1.27 inches (3.23 cm). Many elastic materials may be elongated by much more than 60 percent (i.e., much more than 160 percent of their relaxed length), for example, elongated 100 percent or more, and many of these will recover to substantially their initial relaxed length, for example, to within 105 percent of their initial relaxed length, upon release of the stretching force.

The elasticity was measured on yarns formed from the bicomponent fibers as the percent strain recovery at 100 percent elongation. The yarn consisted of a multiplicity of individual continuous fibers ranging in number from 36 to 144 depending upon the number of holes in the spinneret. The yarn was stretched manually to 100% elongation and then allowed to relax. The relaxed length of the yarn was then measured and the percent recovery calculated. In this method the elasticity is determined as the percent recovery.

As used herein, the term "tenacity" refers to the measure of tensile strength of a yarn as measured in grams per denier.

Examples 1-8

Bicomponent fibers with a polypropylene sheath and a SEBS elastomer core at sheath/core ratios of 30/70 and 20/80 were made according to the following description. The polypropylene sheath was a nominal 38 MFR homopolymer (5D49) from The Dow Chemical Company. The elastomer core (Polymer 7) was a nominal 50 MFR, high vinyl (vinyl content=75 mol %), coupled SEBS copolymer (coupling efficiency=96%) with an 18% styrene content, a styrene MW of 6600 and a midblock molecular weight of 60,000.

The fibers were made using a conventional, commercial-type high speed spinning process using bicomponent technology and spinnerets from Hills Inc.

Table 1 gives typical spinning performance and mechanical properties of the fibers. From Table 1, one can see that high speed spinning can be achieved (Examples 3 5, and 8) as well as reasonable fiber tensile strength and elongation-to-break (Examples 1, 2, 4, 6, 7). Exceptionally high spinning speeds were attainable. The sheath-core bicomponent fibers (Examples 3 and 5) were spun at 2700 mpm.

Examples 9-13

Bicomponent fibers with a polypropylene sheath and a SEBS elastomer core at sheath/core ratios of 30/70 and 20/80 were made according to the following description. The polypropylene sheath was a nominal 38 MFR homopolymer (5D49) from The Dow Chemical Company. The elastomer core (Polymer 5) was a 31 MFR, high vinyl (vinyl content=76%), coupled SEBS copolymer (coupling efficiency=94%) with an 18% styrene content, a styrene MW of 6200 and a midblock molecular weight of 56,000.

The fibers were made via a conventional, commercial-type high speed spinning process using bicomponent technology and spinnerets from Hills Inc.

Good tensile properties could be achieved with the 31 MFR elastomer (Examples 9, 11 and 12). The attainable spinning speed was in the range of 1500 to 1800 mpm.

Examples 14-25

Bicomponent fibers with a polypropylene sheath and a SEBS elastomer core at sheath/core ratios of 30/70 and 20/80 were made according to the following description. The polypropylene sheath was a nominal 38 MFR homopolymer (5D49) from The Dow Chemical Company. The elastomer core (Polymer 6) was a nominal 20 MFR, high vinyl (vinyl content=76%), coupled SEBS copolymer (coupling efficiency=95%) with an 19% styrene content, a styrene MW of 6100 and a midblock molecular weight of 50,000.

The fibers were made via a conventional, commercial-type high speed spinning process using bicomponent technology and spinnerets from Hills Inc.

The results of Table 3 demonstrate that a lower melt flow elastomer has a detrimental effect on the spinning performance (maximum spinning speed) but the tensile properties are still considered to be reasonable for an elastic fiber. Table 3 also shows that as the polypropylene becomes a greater portion of the fiber cross-section that spinning performance improves and that even relatively low melt flow elastomers can offer good spinning performance with the correct sheath/core ratio. In addition, the polypropylene improves the tensile strength of the fibers as its concentration increases but probably has a negative effect on the fiber elasticity.

Examples 26-36

Bicomponent fibers with a polypropylene sheath and a SEBS elastomer core at sheath/core ratios of 30/70 and 20/80 were made according to the following description. The polypropylene sheath was a nominal 38 MFR homopolymer (5D49) from The Dow Chemical Company. The elastomer core was a blend with polypropylene (5D49) and an elastomer (Polymer 7). Blend 1 was a blend of 10 wt % Dow 5D49 polyproplene with 90 wt % Polymer 7. Blend 2 was a blend of 20 wt % Dow 5D49 polypropylene with 80 wt % Polymer 7.

The fibers were made via a conventional, commercial-type high speed spinning process using bicomponent technology and spinnerets from Hills Inc. Table 4 demonstrates that elastomer blends with polypropylene made good elastomeric cores for bicomponent elastic fibers. High spinning speeds and good tensile and elastic properties were achieved.

A comparative monocomponent fiber (Example 36) is also shown in Table 4. The monocomponent fiber consisted only of the elastomer compound (Polymer 7) and no thermoplastic polymer sheath. Low spinning speeds were required and the fibers exhibited unacceptable stickiness during the spinning process. The resulting monocomponent fibers self-adhered and could not be separated.

Examples 37-39

Bicomponent fibers were also spun via a single air aspirator to simulate a spunbond process. Air pressure in the aspirator was used to affect the maximum spinning speed, i.e., the higher the pressure the higher the spinning speed. For all of the examples the polymer throughput per hole (0.35 g/hole/min) is the same.

Example 37 was a comparative monocomponent fiber of 5D49 polypropylene alone. The maximum air pressure reached 40 psi before fibers began to break. The fibers of this thermoplastic polymer had no elasticity.

Example 38 used a 5D49 polypropylene sheath and a 50 MFR elastic core (Polymer 7) at a 20/80 ratio to produce elastic spunbond fibers. The maximum spinning speed was 20 psi before filaments began to break. Example 39 was a bicomponent fiber of polypropylene (5D49) and a 20 MFR elastomer (Polymer 6) at a sheath/core ratio of 40/60. The maximum spinning speed was 25 psi before fibers began to break. The bicomponent fibers of Examples 38 and 39 were elastic.

Example 40-45

Examples 40 through 44 demonstrate sheath/core bicomponent fibers using Dow ASPUN polyethylene as the thermoplastic polymer sheath (6811A) and Polymer 7 as the elastomeric core. These examples demonstrate that polyethylene can also be used as a sheath for bicomponent elastic fibers.

The fibers were made via a conventional, commercial-type high speed spinning process using bicomponent technology and spinnerets from Hills Inc.

Example 46

A bicomponent elastic fiber was made with a relatively low melt flow rate, low vinyl elastomer (Polymer 8) according to the following description. Polymer 8 was a nominal 9 MFR, 38% vinyl coupled SEBS elastomer. It has a styrene block molecular weight of 5000, a midblock molecular weight of 47,000, and a coupling efficiency of 94%. The nominal styrene content is 18 wt %. The sheath for this fiber is a nominal 12 MFR homopolymer polypropylene. While this example demonstrates that bicomponent fibers can be made using low vinyl block copolymers, a higher melt flow rate elastomer would be preferred for optimal spinning performance.

TABLE 1

| Example | Sheath/Core Ratio | Spinning Speed (mpm) | Tenacity (g/dn) | Elongation at Break (%) | Elasticity (%) | Highest Spinning Speed | Spinneret # of holes | Denier per filament (dpf) |
| --- | --- | --- | --- | --- | --- | --- | --- | --- |
| 1 | 20/80 | 500 | 0.3 | 500 | 70 | — | 72 | 15 |
| 2 | 20/80 | 1400 | 0.6 | 320 | 80 | — | 72 | 5.4 |
| 3 | 20/80 | — | — | — | — | 2700 | 72 | — |
| 4 | 30/70 | 500 | 0.3 | 550 | — | — | 72 | 15 |
| 5 | 30/70 | — | — | — | — | 2700 | 72 | — |
| 6 | 20/80 | 500 | 0.2 | 560 | — | — | 36 | 27 |
| 7 | 20/80 | 1500 | 0.3 | 280 | — | — | 36 | 7.6 |
| 8 | 20/80 | — | — | — | — | 3000 | 36 | — |

TABLE 2

| Example | Sheath/Core Ratio | Spinning Speed (mpm) | Tenacity (g/dn) | Elongation at Break (%) | Elasticity (%) | Highest Spinning Speed |
| --- | --- | --- | --- | --- | --- | --- |
| 9 | 20/80 | 500 | 0.3 | 470 | — | — |
| 10 | 20/80 | — | — | — | — | 1500 |
| 11 | 30/70 | 500 | 0.3 | 570 | — | — |
| 12 | 30/70 | 1400 | 0.7 | 250 | 75 | — |
| 13 | 30/70 | — | — | — | — | 1800 |

TABLE 3

| Example | Sheath/Core Ratio | Spinning Speed (mpm) | Tenacity (g/dn) | Elongation at Break (%) | Elasticity (%) | Highest Spinning Speed | Denier per filament (dpf) |
| --- | --- | --- | --- | --- | --- | --- | --- |
| 14 | 20/80 | 500 | 0.3 | 500 | — | — | 14.5 |
| 15 | 20/80 | 1000 | 0.5 | 310 | — | — | 7.5 |
| 16 | 20/80 | — | — | — | — | 1100 | — |
| 17 | 30/70 | 500 | 0.3 | 490 | — | — | 14.5 |
| 18 | 30/70 | 1400 | 0.7 | 250 | 80 | — | 5 |
| 19 | 30/70 | — | — | — | — | 1500 | — |
| 20 | 40/60 | 500 | 0.5 | 660 | — | — | 14.5 |
| 21 | 40/60 | 1400 | 0.8 | 320 | — | — | 5 |
| 22 | 40/60 | — | — | — | — | 1900 | — |
| 23 | 50/50 | 500 | 0.5 | 660 | — | — | 14.5 |
| 24 | 50/50 | 1400 | 0.9 | 330 | 50 | — | 5 |
| 25 | 50/50 | — | — | — | — | 2500 | — |

TABLE 4

| Example | Core | Sheath/Core Ratio | Spinning Speed (mpm) | Tenacity (g/dn) | Elongation at Break (%) | Elasticity (%) | Highest Spinning Speed (mpm) | Comments/denier per filament (dpf) |
|---|---|---|---|---|---|---|---|---|
| 26 | Blend 1 | 0/100 | — | — | — | — | 800 | No sheath, very sticky |
| 27 | Blend 1 | 20/80 | 500 | 0.1 | 660 | — | — | 21 dpf |
| 28 | Blend 1 | 20/80 | 1500 | 0.2 | 310 | 75 | — | 7.7 dpf |
| 29 | Blend 1 | 20/80 | 2000 | 0.4 | 200 | — | — | 6 dpf |
| 30 | Blend 1 | 20/80 | — | — | — | — | 2700 | — |
| 31 | Blend 2 | 0/100 | — | — | — | — | 800 | No sheath, very sticky |
| 32 | Blend 2 | 20/80 | 500 | 0.2 | 530 | — | — | 21 dpf |
| 33 | Blend 2 | 20/80 | 1500 | 0.3 | 200 | 70 | — | 7.7 dpf |
| 34 | Blend 2 | 20/80 | 2000 | 0.4 | 160 | 75 | — | 6 dpf |
| 35 | Blend 2 | 20/80 | — | — | — | — | 3000 | — |
| 36 | Polymer 7 | 0/100 | — | — | — | — | 800 | No sheath, very sticky |

TABLE 5

| Example | Sheath | Core | Sheath/Core Ratio | Max Spinning Speed (psi) | Elasticity (%) |
|---|---|---|---|---|---|
| 37 | 5D49 | — | 100/0 | 40 | 0 |
| 38 | 5D49 | Polymer 7 | 20/80 | 20 | — |
| 39 | 5D49 | Polymer 6 | 40/60 | 25 | 75 |

TABLE 6

| Example | Sheath/Core Ratio | Spinning Speed (mpm) | Denier per filament (g/9000 m) | Tenacity (g/dn) | Elongation at Break (%) | Elasticity (%) | Highest Spinning Speed |
|---|---|---|---|---|---|---|---|
| 40 | 20/80 | 300 | 17.6 | 0.1 | 660 | — | — |
| 41 | 20/80 | 500 | 11.6 | 0.1 | 680 | — | — |
| 42 | 20/80 | — | — | — | — | — | 500 |
| 43 | 30/70 | 500 | 11.6 | 0.1 | 580 | 60 | — |
| 44 | 30/70 | 1000 | 5.2 | 0.2 | 360 | 50 | — |
| 45 | 30/70 | — | — | — | — | — | 1000 |

TABLE 7

| Example | Sheath/Core Ratio | Spinning Speed (mpm) | Tenacity (g/dn) | Elongation at Break (%) | Elasticity (%) |
|---|---|---|---|---|---|
| 46 | 20/80 | 500 | 0.02 | 480 | 80 |

What is claimed is:

1. A process to produce a bicomponent fiber comprising, a thermoplastic polymer sheath and an elastomeric compound core wherein the elastomeric compound core comprises a selectively hydrogenated block copolymer having an S block and an E or $E_1$ block and having the general formula:

S-E-S, $(S-E_1)_n$, $(S-E_1)_nS$, $(S-E_1)_nX$ or mixtures thereof, wherein:

a. prior to hydrogenation the S block is a polystyrene block;

b. prior to hydrogenation the E block is a polydiene block, selected from the group consisting of polybutadiene, polyisoprene and mixtures thereof, having a molecular weight from 40,000 to 70,000;

c. prior to hydrogenation the $E_1$ block is a polydiene block, selected from the group consisting of polybutadiene, polyisoprene, and mixtures thereof, having a molecular weight from 20,000 to 35,000;

d. n has a value of 2 to 6 and X is the residue of a coupling agent;

e. the styrene content of the block copolymer is from 13 to 25 weight percent;

f. the vinyl content of the polydiene block prior to hydrogenation is from 70 to 85 mol percent;

g. the block copolymer includes less than 15 weight percent of units having the general formula: S-E or S-$E_1$ wherein S, E and $E_1$ are as already defined;

h. subsequent to hydrogenation about 0 to 10% of the styrene double bonds have been hydrogenated and at least 80% of the conjugated diene double bonds have been hydrogenated;

i. the molecular weight of each of the S blocks is from 5,000 to 7,000; and j. the melt index of the block copolymer is greater than or equal to 12 grams/10 minutes according to ASTM D1238 at 230° C. and 2.16 kg weight, whereby the process comprises coextrusion of a thermoplastic polymer and an elastomeric compound wherein the thermoplastic polymer and the elastomeric compound are forced using separate melt pumps to extrude through a die to form one or more fibers having a sheath primarily consisting of the thermoplastic polymer and a core primarily consisting of the elastomeric compound at a rate of at least 500 meters per minute such that the bicomponent fiber has a denier per filament from 0.1 to 30 grams per 9000 meters.

2. The process of claim 1 wherein the polydiene blocks E and $E_1$ have a vinyl content from 73 to 83 percent.

3. The process of claim 1 wherein the bicomponent fibers have a denier per filament from 1 to 10 grams per 9000 meters.

4. The process of claim 1 wherein the bicomponent fibers are extruded at a rate of at least 2000 meters per minute.

* * * * *